United States Patent

Hanks

[15] 3,667,581
[45] June 6, 1972

[54] COMBINATION CLUTCH-BRAKE

[72] Inventor: James V. Hanks, Minneapolis, Minn.

[73] Assignee: Horton Manufacturing Company, Inc., Minneapolis, Minn.

[22] Filed: Mar. 16, 1970

[21] Appl. No.: 19,883

[52] U.S. Cl. .......................... 192/18.1, 192/12 B, 192/113 A
[51] Int. Cl. .......................................................... F16d 67/02
[58] Field of Search ............................. 192/18 A, 12 B, 113 A

[56] References Cited

UNITED STATES PATENTS

| | | | |
|---|---|---|---|
| 2,584,190 | 2/1952 | Danly et al. | 192/113 A |
| 3,157,257 | 11/1964 | Root | 192/18 B |
| 3,468,402 | 9/1969 | Edwards | 192/113 A |

*Primary Examiner*—Benjamin W. Wyche
*Assistant Examiner*—Randall Heald
*Attorney*—Wicks and Nemer

[57] ABSTRACT

A combination clutch-brake which includes a clutch unit including a clutch housing, a first hub, an annular clutch piston slidably mounted on said hub, an annular clutch cylinder carried by said clutch housing, a friction disc having fins thereon slidably mounted on and rotatable with the first hub, a brake unit including a disc journal having air passageways extending radially therein and mounted on a second hub, means rotatably mounting said second hub axially on said first hub, spring means normally urging said friction disc out of engagement with said disc journal, a brake housing mounted on said second hub, means connecting said clutch housing with said brake housing said brake housing having an annular cylinder formed therein, an annular piston base having an annular brake piston thereon and slidable within the annular cylinder, the brake piston having a friction facing thereon in axial alignment with the disc journal, means for normally urging the annular brake piston with said friction facing thereon out of engagement with said disc journal, means for causing fluid pressure to urge said clutch piston against said friction disc to cause said second hub to rotate, means for causing fluid pressure to urge said brake piston against said disc journal to brake the second hub, the friction disc formed with air passageways extending therethrough, the disc journal formed with air passageways extending therethrough and communicating with said air passageways of said friction disc, the brake piston base formed with air passageways extending therethrough and communicating with said air passageways of said disc journal, and the means connecting said clutch housing with said brake housing being separable.

7 Claims, 14 Drawing Figures

INVENTOR
JAMES V. HANKS

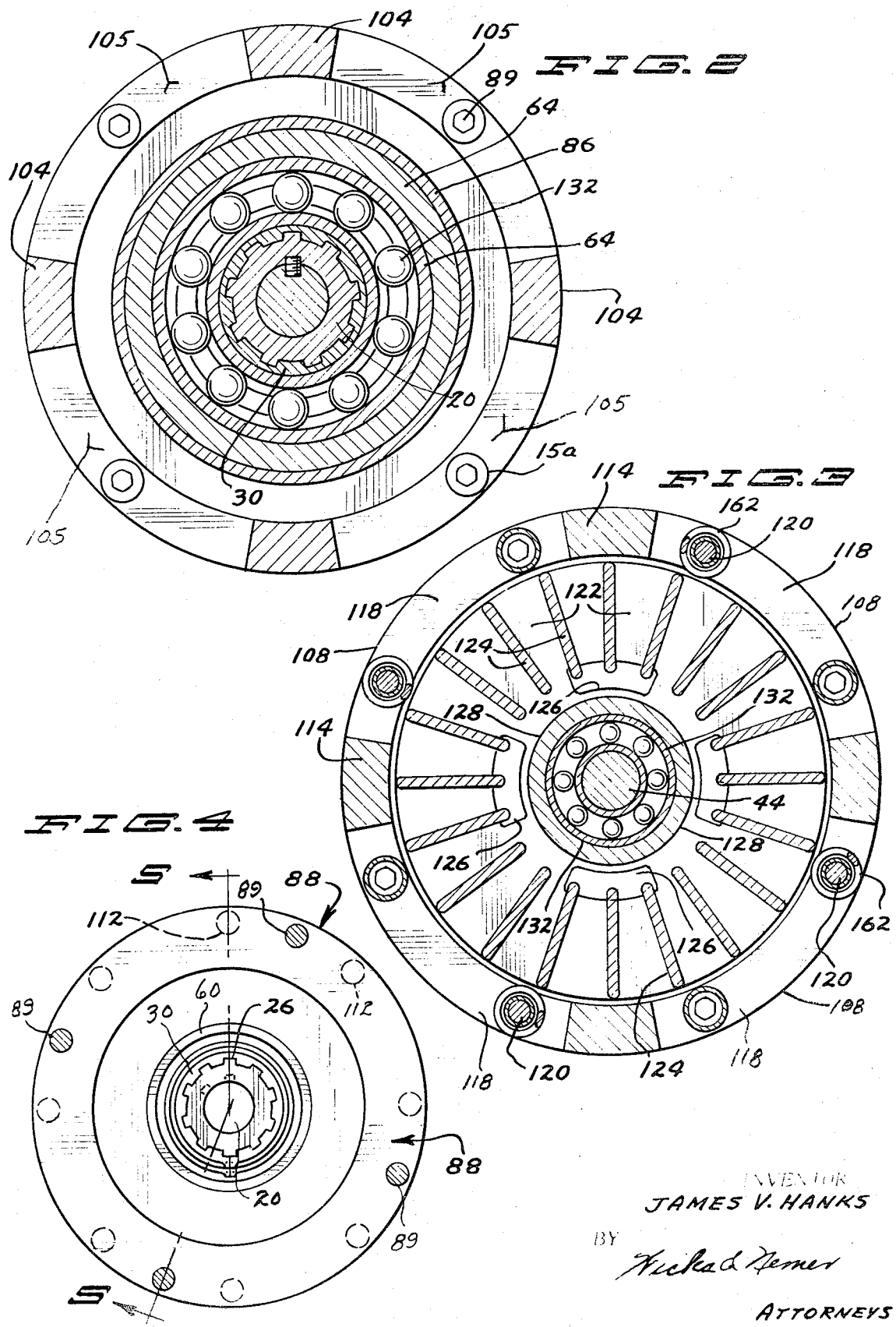

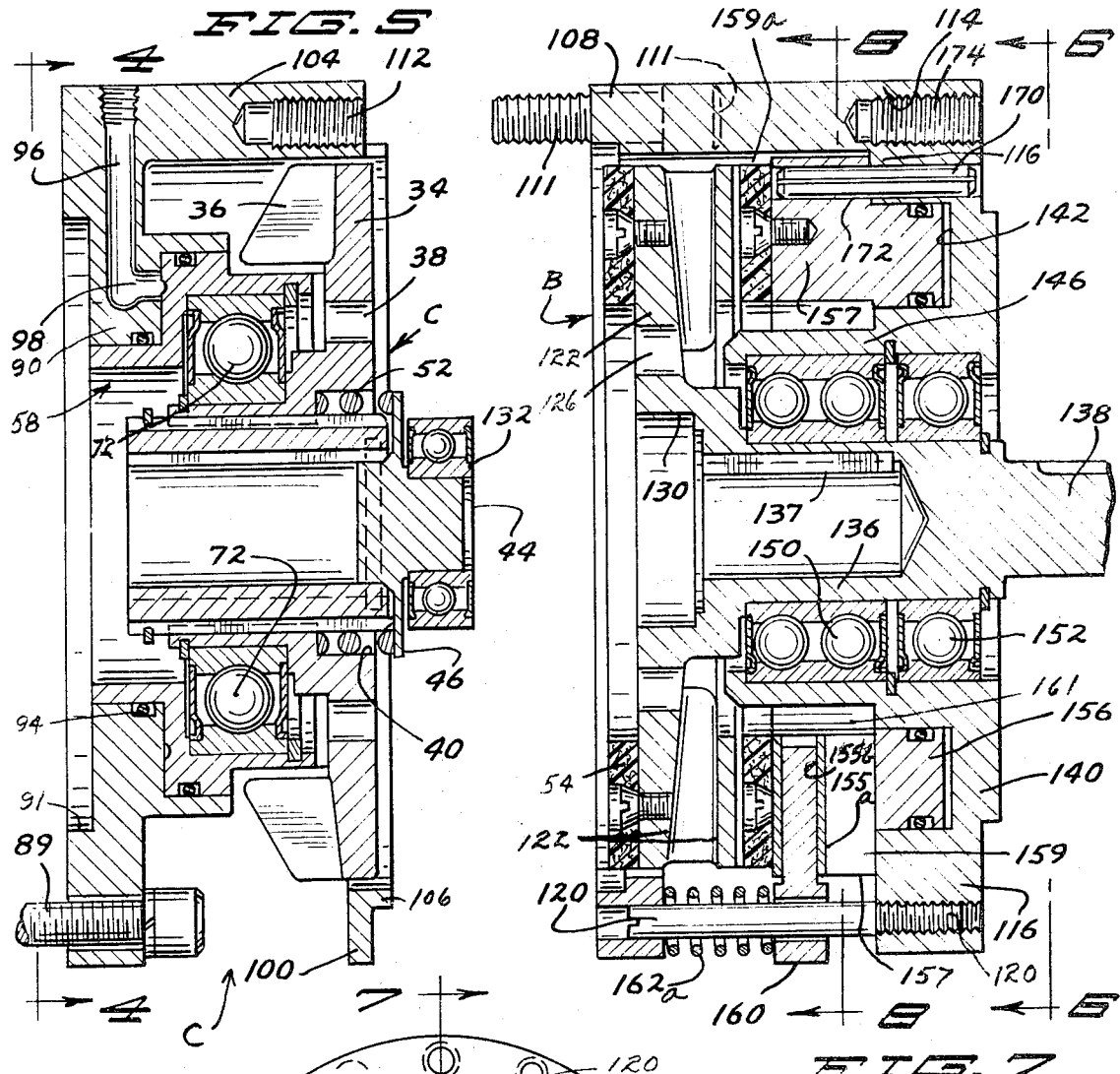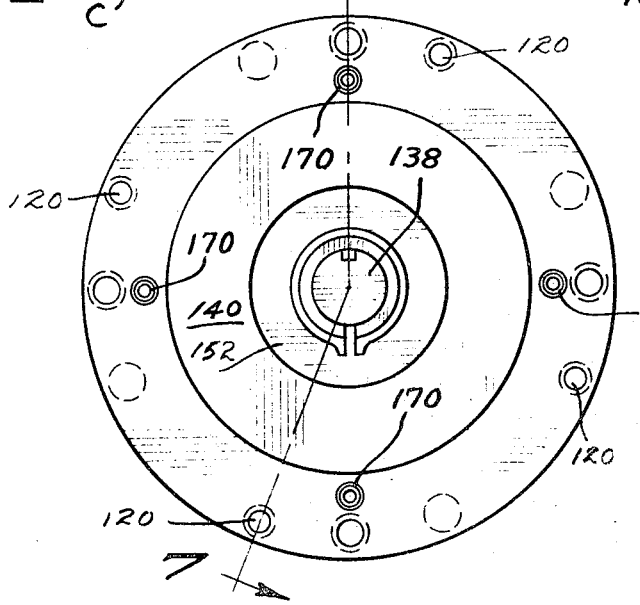

INVENTOR
JAMES V. HANKS
BY
Hicks & Nemer
ATTORNEYS

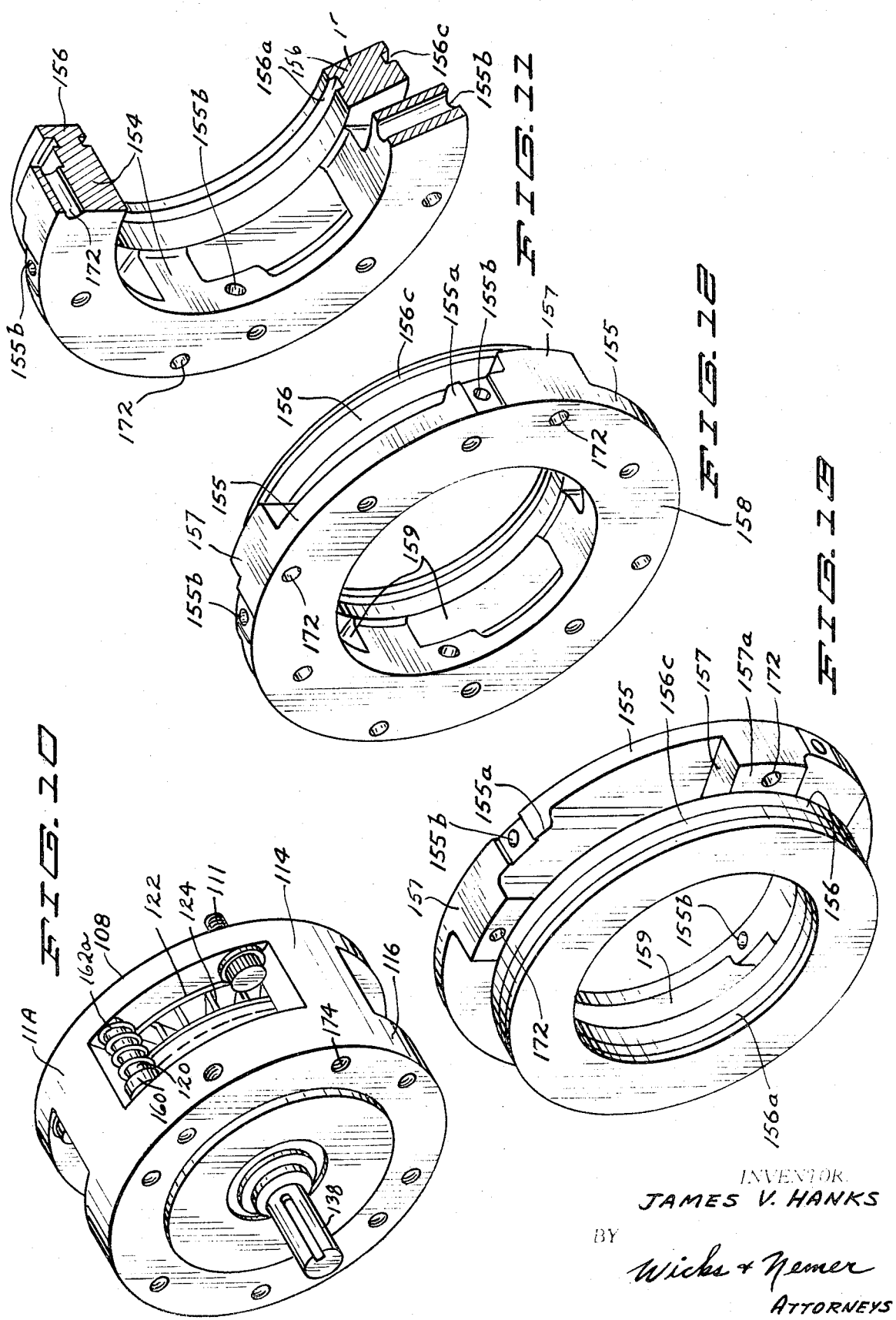

3,667,581

COMBINATION CLUTCH-BRAKE

SUMMARY OF THE INVENTION

The invention relates to an improvement in a combination clutch-brake which is mounted on a prime mover such as an electrical motor and which is used to clutch in or alternately brake a gear reducer for example, connected to the brake unit of the device. With the construction disclosed the brake unit may be easily separated from the clutch unit and the brake unit or module used separately. Alternately the operative portions of the brake unit may be removed and the clutch unit module used separately. The combination clutch-brake includes a construction whereby the brake is cooled both in an operating condition or in an inoperative condition by the rotation of the clutching unit friction disc.

Briefly, the device includes a finned driven friction disc clutching member engageable with a disc journal fixedly connected to a hub for rotation of the hub and a braking member which is engageable with the disc journal for braking the hub. The friction disc is driven and rotatably mounted in a clutch housing, and the disc journal and the braking member are mounted in a brake housing removably attached to the clutch housing. The clutch housing is formed with air passageways as is the disc journal and the passageways communicate. The brake housing is formed with air passageways as is the brake body. Rotation of the friction disc causes a first flow of air into and out of the air passageways of the clutch housing and friction disc which draws a second flow of air inwardly through the air passageways of the disc journal and also draws a third flow of air inwardly through the air passageways of the brake housing and brake body, the second and third air flows joining the first air flow for exodus out of the clutch housing thereby cooling the brake unit when the disc journal and hub thereon is braked or in a free static condition. Alternatively, when the friction disc is in engagement with the disc journal and rotating the same, air is drawn radially inwardly through the air passageways of the brake housing and brake body and exhausted outwardly through the air passageways of the disc journal thereby cooling the brake unit.

In the drawings forming part of this application:

FIG. 2 is a sectional view on the line 2—2 of FIG. 1.

FIG. 3 is a sectional view on the line 3—3 of FIG. 1.

FIG. 4 is a view on the line 4—4 of FIG. 5 in reduced size.

FIG. 5 is a sectional view on the line 5—5 of FIG. 4 in reduced size.

FIG. 6 is a view on the line 6—6 of FIG. 7.

FIG. 7 is a sectional view on the line 7—7 of FIG. 6.

FIG. 10 is a perspective view of the brake unit shown removed from the clutch unit.

FIG. 11 is a perspective view of the annular piston base and piston a portion of which has been broken away.

FIG. 12 is a perspective view of the annular piston base and piston.

FIG. 13 is a perspective view of the annular piston base and piston as shown in FIG. 12 but rotated 180°.

Figures 1, 1A:
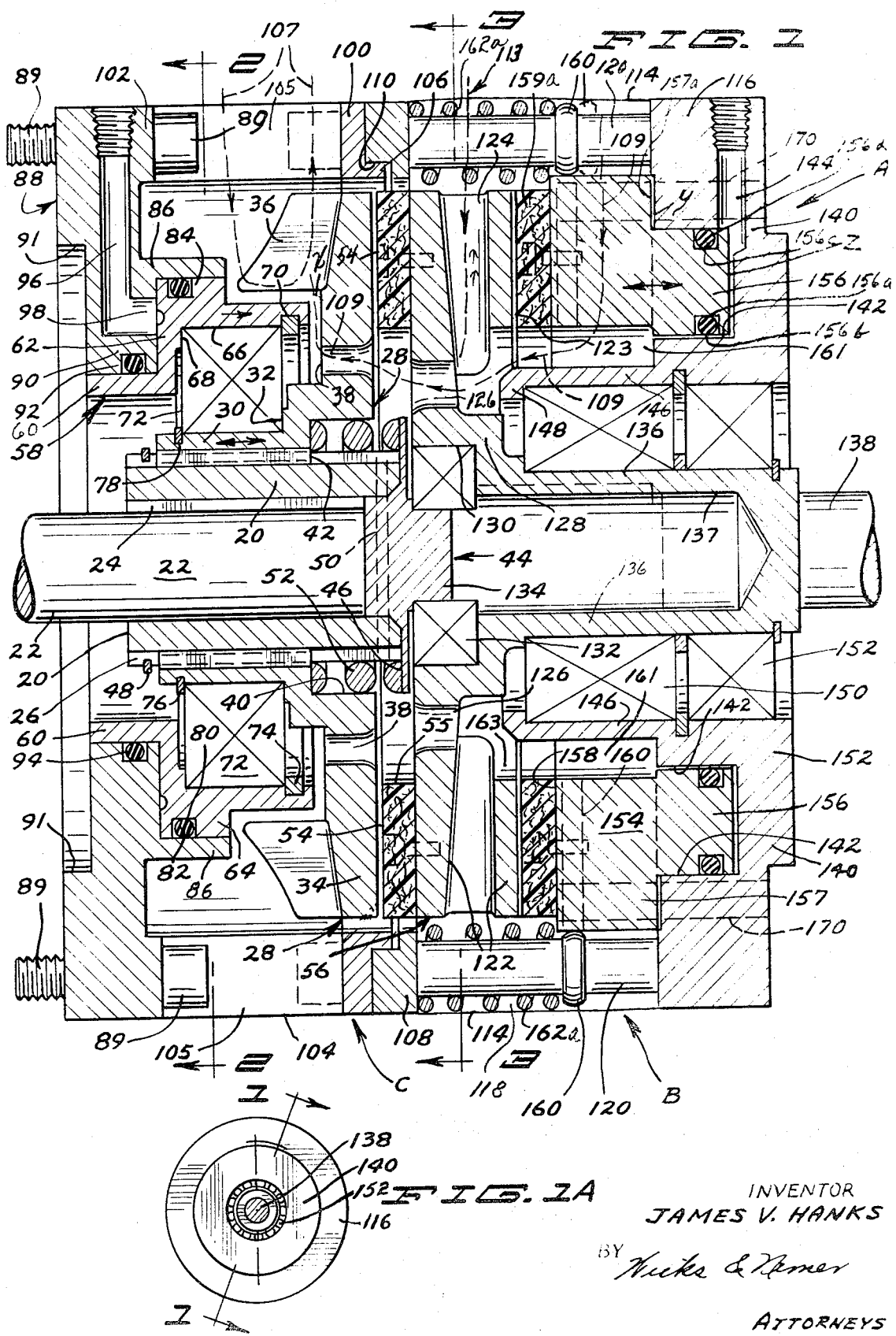
FIG. 1 is a longitudinal sectional view on the line 1—1 of FIG. 1a of a clutch-brake embodying the invention.
FIG. 1a is an end elevational view of the output end of the device.

Referring to the drawings in detail, the clutch-brake A includes on the clutch portion C a first hollow hub 20 which has a key slot formed on the inner surface for keying the hub to a motor shaft 22 by means of key 24. The hub 20 also has splines 26 formed on the outer surface thereof. Further provided is the rotatable friction disc 28 which includes the cylindrical base portion 30 which is splined internally for sliding engagement with the splines 26 of the hub. Formed on the base portion 30 is the annular shoulder portion 32 and connected to the shoulder portion 32 is the radially extending disc body 34 from which extends the cooling fins 36.

The disc body 34 has formed therein the spaced air passages 38 and inwardly thereof the annular recess 40 including the annular shoulder 42. The numeral 44 designates an annular spring retainer formed with the annular flange portion 46 which has substantially the radial extent of the recess 40. Mounted on the hub 20 is the conventional ring retainer 48 which limits the outward sliding movement of the base portion 30 of the friction disc 28 on the hub. The retainer 44 is securely pinned to the hub by means of a pin 50. Positioned on the splines 26 of the hub 20 is the coil spring 52 between the shoulder 42 of the disc 28 and the flange 46 of the retainer 44 thereby normally urging the friction disc 28 out of engagement with the friction facing ring 54 of the disc journal 56 hereinafter described as part of the brake unit B. The ring 54 has the central axial opening 55. The disc journal 56 performs a dual purpose of clutching in the output shaft and also braking the output shaft 138 as will be hereinafter pointed out.

The numeral 58 designates an annular piston which includes the annular flange 60 concentric with and spaced from the base 30 of disc 28. Extending radially outwardly from the flange 60 is the piston top wall 62 which terminates in the annular wall 64 in which is formed the annular recess 66 with the annular shoulder 68 and the annular recess 70. A bearing 72 is press fit upon the recess 66 and the cylindrical base portion 30 of the friction disc 28 with the bearing abutting the annular shoulder 68, the ring retainer 74 in the recess 70, the ring retainer 76 in the annular recess 78 formed in base portion 30, and the bearing is also in abutment with annular shoulder 32. Thus the annular piston member 58 is mounted on the friction disc 28 by means of the bearing 72 and allows relative rotation therebetween.

The annular wall 64 has formed on the outer surface thereof the annular recess 80 in which is mounted the O-ring 82 and makes sliding sealing contact with the cylindrical surface 84 of the annular flange 86 which extends axially from the annular housing chamber 88. The housing chamber 88 also includes the annular flange 90 in which is formed the annular recess 92 in which is positioned the O-ring 94 which makes sliding sealing contact with the outer annular surface of the annular flange 60 which is slidable upon the flange 90. The housing chamber 88 is secured to a motor not shown, by means of spaced bolts 89. The housing 88 is also formed with the circular recess 91 which receives a mounting rabbet formed on the motor. The flanges 90 and 86 act as cylinder walls on which the piston 58 slides, the O-rings 82 and 94 providing a sealing contact.

The housing chamber 88 has formed therein the air passageway 96 which leads to the chamber 98 at the top wall 62 of the piston member 58. As fluid pressure is admitted to chamber 98 from a source not shown piston 58 is moved axially with bearing 72 and friction disc 28 slidable upon hub 20 whereby disc body 34 may be brought into engagement with the friction facing 54 of disc journal 56 thereby rotating the disc journal 56. The disc 28 rotates at all times during the use of the device, for it is positively connected to the motor shaft 22.

The housing 88 further includes the annular wall 100 spaced from and connected to the annular wall 102 by means of spaced web formation 104 and the annular wall 100 is formed with the concentric flange 106. The webs 104 define voids 105 as air passageways therebetween. The numeral 108 designates a first stationary annular rim formed with the annular recess 110 into which the flange 106 fits with the wall 100 of the rim 108 in abutment and held in abutment by a multiplicity of cap screws 111, FIG. 7, in engagement with the tapped holes 112 of the webs 104. The screws 111 extend through holes formed in the first annular rim 108. Between the webs 114 and the rims 108 and 116 all part of brake unit B and shown in FIG. 3 are the voids 118. Secured in rim 116 and extending through and from the rim 108 are the spaced spring guide pins 120.

The disc journal 56 as part of the brake unit B includes the disc body 122 to which the friction ring 54 is secured, and extending from the body 122 are the spaced and radially extending web-like cooling fins 124. The disc body is also formed with the friction surface 123. The body 122 is also formed with spaced air passages 126 which are substantially in alignment with the passages 38 of disc body 34. The disc journal 56 also includes a central and second hub portion 128 formed with the recess 130 into which is fit the outer race of the bearing 132 with the inner race thereof fit onto the end portion 134 of the retainer 44. Extending from the central hub portion 128 and as part thereof is the hollow cylindrical hub extension 136 which has extending from the outer end thereof the shaft 138 which is the output end of the device A. The shaft 138 may be connected to a gear reducer as an example of use of the device A whereby the reducer may be stopped and started.

Also included in the brake unit B is the stationary housing portion 140 which extends radially inwardly from and includes rim 116. The housing portion 140 is formed with the annular cylinder 142 and the air inlet passage 144. The housing portion 140 has extending inwardly therefrom and as part thereof the cylindrical flange 146 with the radially annular inturned lip 148. The housing 140 and flange portion 146 thereof is mounted on the hub extension 136 by means of the bearing 150 and the bearing 152 which allows relative rotation between the housing and the hub extension 136. The hub extension 136 is formed with the hollow recess 137.

The numeral 154 designates an annular piston base and extending axially therefrom is the annular piston 156 which is slidably positioned in the annular cylinder 142. The piston 156 has formed therein the inner annular groove 156a in which is positioned the O-ring 156b. The piston 156 is also formed with the annular outer groove 156c in which is positioned the O-ring 156a, particularly FIG. 1.

The piston base 154 includes a rim 155 as part thereof from which axially extends spaced webs 157 which in turn form voids 159 which act as air passageways between the webs 157. The outer ends of webs 157 mount the annular piston 156, and the outer face 157a of the webs 157 abut the inner face of rim 116 as at Y, particularly FIGS. 1 and 7, thereby limiting the travel of the piston 156 so that a void as at Z is maintained between the piston and the top of the cylinder 142 so that there is not bottoming out of the piston. Secured to the inner face 158 of this annular piston base 154 is the friction ring 159a. Also provided are a multiplicity of radially extending spaced eye bolts 160 mounted in a hole 155b formed in a raised portion 155a of rim 155 the inner end 162 of which is secured in the piston base 154. The guide pins 120 extend through the eye of each of the eye bolts 160, and on each pin 120 is a coil spring 162a interposed between the eye of each eye bolt 160 and the first annular rim 108 whereby the annular piston 156 is normally urged into the annular cylinder 142 through the eye bolts 160 of the piston base 154 thereby holding disc 159 out of contact with disc journal 122.

The piston 156 and base 154 thereof is moved to cause braking contact of friction ring 159a with disc body 122 to thereby brake shaft 138 by means of fluid pressure entering passage 144 into cylinder 142 and upon piston 156.

With all of the various parts of the brake unit B assembled there is formed the annular air passageway 163 which communicates with the spaced air passages 126.

Figure 8:
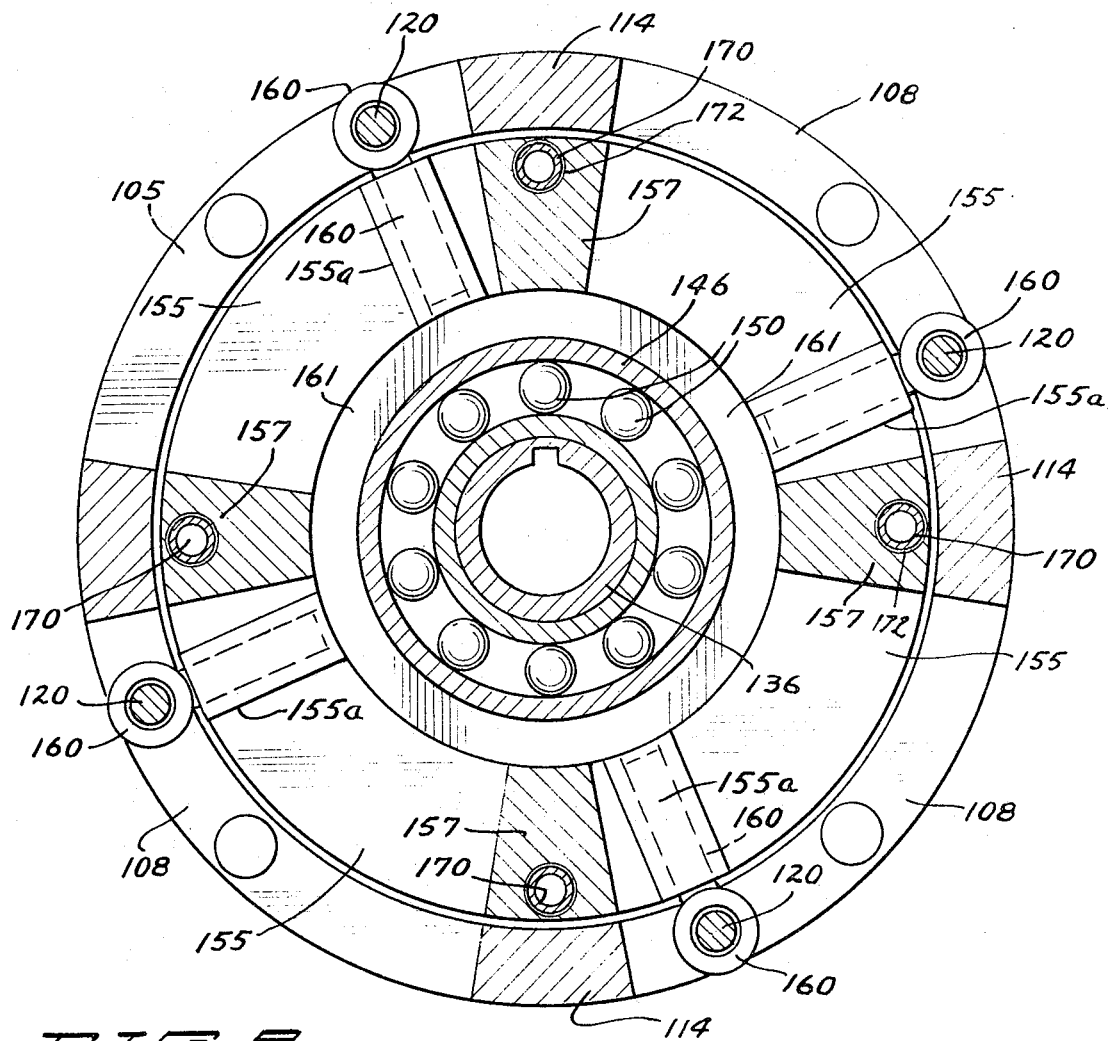
FIG. 8 is a sectional view on the line 8—8 of FIG. 7.
Figure 9:
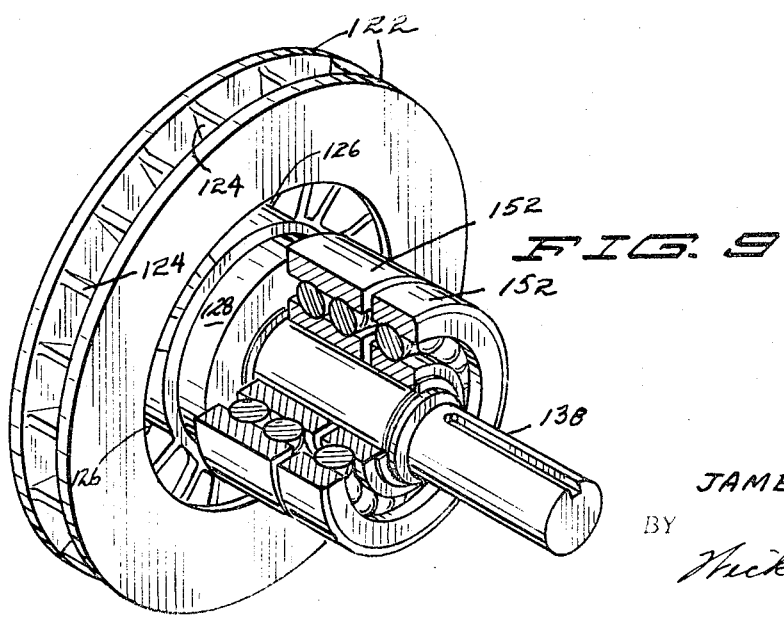
FIG. 9 is a perspective view of the disc journal and hub together with the bearings mounted thereon shown removed from the device.

Further provided are the spaced torque pins 170, particularly FIGS. 6, 7, and 8. The outer ends of the pins 170 are anchored in the housing 140 and inwardly through loose fit holes 172 of the webs 157 allowing axial movement of the piston base 154 and the piston 156 thereon. The pins 170 also prevent the piston 156 and its base 154 from having relative rotation with respect to housing 140, the housing 140 being stationary.

The tapped holes 174 are formed in the webs 114 for receiving mounting screws of a device used with unit A.

As will be noted, particularly from FIGS. 5 and 7, the clutch unit or module C is connected with the brake unit or module B for coaction therewith by means of the cap screws 111 in engagement with the taped holes 112 of the webs 104 with the bearing 132 fit into the recess 130 of the second hub portion 128. The clutch module C may be used independently by removing the brake piston 156 and its base portion 154 from the unit, and with such removal the hub 136 and the output shaft 138 thereon may be clutched in or out by the Unit C.

The brake unit or module B may be used independently by removing the clutch unit C and bolting the rim 108 of the brake unit to a mounting plate of a motor, not shown, with the shaft 22 of the motor keyed into the recess 137 of the hub 136. By application of fluid pressure to the brake piston 156, the friction ring 159 engages the friction surface 123 of disc journal 122 thereby braking the shaft 138. It is thus apparent that the construction of either unit C or B is not dependent upon the construction of the other unit, whereby each unit may be used separately and that both units together produce a device for selectively and alternately clutching and braking the output shaft.

OPERATION

In use of the device fluid pressure is introduced into passage 96 whereby piston 58 is moved axially which causes the body portion 34 of friction disc 28 to engage the friction ring 54 of disc journal 56 thereby driving the shaft 138. The shaft 138 may be braked by declutching the unit C by exhausting fluid pressure from passageway 96 by conventional valving not shown. Substantially simultaneously with the exhaust of passageway 96 fluid pressure is introduced into passageway 144 whereby friction ring 159a is brought into contact with disc body 122 which brakes the shaft 138.

In the operation of the device the fins 36 of the friction disc 28 are continually rotating during clutching or braking thus drawing air in horseshoe fashion downwardly through voids or passageways 105 and back upwardly about the fins 36 as indicated by the broken line 107 in FIG. 1. The above mentioned flow of air takes place at all times during clutching, braking or when there is not clutching or braking.

At the same time air is drawn in through voids or air passageways 118 onward into voids or air passageways 159, particularly FIG. 7, in piston base 154 and thence through annular cavity 161, particularly FIG. 8, to annular cavity 163 from where it travels to and through spaced passageways 126. The air further travels through the central opening 55 of friction ring 54 and thence through the passages 38 of friction disc 28. The air then exits out along the fins 36 where it joins the air flow indicated by the broken line 107 previously described. The above described flow is indicated by broken line 109. This flow continuously cools the brake parts.

When the disc journal 122 is static such as in braking, there is a tributary flow of air shown in broken line 113 down through voids 118 in the brake housing and further through the space between the fins 124 where it joins the air flow shown in broken lines as 109 in the cavity 126, particularly FIGS. 1 and 3.

When the disc journal 122 is rotating then the fins 124 of the disc 122 draw and pump air from the air flow line 109 from the area of annular passageway 163 and outwardly between and past the fins 124.

It is understood that suitable modifications may be made in the structure as disclosed.

Having now therefore fully illustrated and described my invention, what is claimed as new and desired to be protected by Letters Patent is:

1. A combination clutch-brake comprising:
   a. a clutch unit including a clutch housing having spaced arcuate voids as air passageways formed in the outer portion thereof,
   b. a first hub having means for connection with a shaft of a prime mover,
   c. an annular clutch piston slidably mounted on said first hub,
   d. an annular clutch cylinder formed on said housing and in which said clutch piston axially reciprocates, e. a friction disc having radially extended cooling fins thereon and slidably mounted on and rotatable with said first hub said fins adjacent said arcuate spaced voids,
f. a brake unit including a disc journal mounted on,
g. a second hub,
h. means rotatably mounting said second hub axially on said first hub,
i. means normally urging said friction disc out of engagement with said disc journal,
j. a brake housing having spaced arcuate voids as air passageways formed in the outer portion thereof and mounted on said second hub,
k. means separably connecting said clutch housing with said brake housing,
l. said brake housing having an annular brake cylinder formed therein,
m. an annular piston base having an annular brake piston thereon and slidable within said annular brake cylinder,
n. said annular brake piston base having a friction facing thereon in axial alignment with said disc journal,
o. means for normally urging said annular brake piston base with said friction facing thereon out of engagement with said disc journal,
p. means for causing fluid pressure to urge said clutch piston against said friction disc to cause said second hub to rotate,
q. means for causing fluid pressure to urge said brake piston against said disc journal to brake said second hub,
r. said friction disc being formed with air passageways extending axially therethrough and radially spaced from said first hub,
s. said disc journal being formed with air passageways extending axially and radially therethrough and communicating with said air passageways of said friction disc,
t. said brake piston base being formed with annular air passageways extending axially therethrough and radially spaced from said second hub and communicating with said air passageways of said disc journal, the rotation of said friction disc causing a flow of air into and out of the air passageways of said clutch housing and friction disc which draws a second flow of air inwardly through the air passageways of the disc journal and a third flow of air inwardly through the air passageways of said brake housing and brake body, said second and third air flows joining said first air flow for exodus out of the clutch housing thereby cooling the brake unit when the disc journal is braked and not braked and alternatively when the friction disc is in engagement with the disc journal and rotating the disc journal air is drawn radially inwardly through the air passageways of said brake housing and brake body and is exhausted outwardly through the air passageways of said disc journal thereby cooling the brake unit,
u. said means for normally urging said friction disc out of engagement with said disc journal including a coil spring mounted concentrically on said first hub in abutment at one end with said friction disc and in abutment at the other end with
v. a shoulder carried by said first hub,
w. said means for normally urging said annular brake piston with said friction facing thereon out of engagement with said disc journal including a rim connected by webs to said brake housing,
x. a multiplicity of spring guide pins connected to said rim and extending through said air passageways of said brake housing,
y. a multiplicity of eye bolts mounted on said annular piston base extending radially therefrom and through which said guide pins extend, and
z. a coil spring mounted on at least one of said guide pins between said rim and the eye of said eye bolt.

2. The device of claim 1 in which
a. said brake housing mounts a multiplicity of torque pins extended freely through b. holes in said webs allowing axial movement of said piston base and said piston thereon and preventing rotation of said brake piston within said brake cylinder.

3. A combination clutch-brake comprising:
a. a clutch unit including a clutch housing having spaced arcuate voids as air passageways formed in the outer portion thereof,
b. a first hub having means for connection with a shaft of a prime mover,
c. an annular clutch piston slidably mounted on said first hub,
d. an annular clutch cylinder formed on said housing and in which said clutch piston axially reciprocates,
e. a friction disc having radially extended cooling fins thereon and slidably mounted on and rotatable with said first hub said fins adjacent said arcuate spaced voids,
f. a brake unit including a disc journal mounted on,
g. a second hub,
h. means rotatably mounting said second hub axially on said first hub,
i. means normally urging said friction disc out of engagement with said disc journal,
j. a brake housing having spaced arcuate voids as air passageways formed in the outer portion thereof and mounted on said second hub,
k. means separably connecting said clutch housing with said brake housing,
l. said brake housing having an annular brake cylinder formed therein,
m. an annular piston base having an annular brake piston thereon and slidable within said annular brake cylinder,
n. said annular brake piston base having a friction facing thereon in axial alignment with said disc journal,
o. means for normally urging said annular brake piston base with said friction facing thereon out of engagement with said disc journal,
p. means for causing fluid pressure to urge said clutch piston against said friction disc to cause said second hub to rotate,
q. means for causing fluid pressure to urge said brake piston against said disc journal to brake said second hub,
r. said means for normally urging said annular brake piston with said friction facing thereon out of engagement with said disc journal including a rim connected by webs to said second housing,
s. a multiplicity of spring guide pins connected to said rim and extending through said air passageways of said brake housing,
t. a multiplicity of eye bolts mounted on said annular piston base extending radially therefrom and through which said guide pins extend, and
u. a coil spring mounted on at least one of said guide pins between said rim and the eye of said eye bolt.

4. A combination clutch-brake comprising:
a. a clutch unit including a clutch housing having spaced arcuate voids as air passageways formed in the outer portion thereof,
b. a first hub having means for connection with a shaft of a prime mover,
c. an annular clutch piston slidably mounted on said first hub,
d. an annular clutch cylinder formed on said housing and in which said clutch piston axially reciprocates,
e. a friction disc having radially extended cooling fins thereon and slidably mounted on and rotatable with said first hub said fins adjacent said arcuate spaced voids,
f. a brake unit including a disc journal mounted on,
g. a second hub,
h. means rotatably mounting said second hub axially on said first hub,
i. means normally urging said friction disc out of engagement with said disc journal, j. a brake housing having spaced arcuate voids as air passageways formed in the outer portion thereof and mounted on said second hub, k. means separably connecting said clutch housing with said brake housing, l. said brake housing having an annular brake cylinder formed therein, m. an annular piston base having an annular brake piston thereon and slidable within said annular brake cylinder, n. said annular brake piston base having a friction facing thereon in axial alignment with said disc journal, o. means for normally urging said annular brake piston base with said friction facing thereon out of engagement with said disc journal, p. means for causing fluid pressure to urge said clutch piston against said friction disc to cause said second hub to rotate, q. means for causing fluid pressure to urge said brake piston against said disc journal to brake said second hub, r. said means connecting said clutch housing with said brake housing being separable and including a bearing mounted on said first hub, s. said second hub being formed with a recess in which said bearing is mounted, whereby the brake housing and the components thereof may be separated from the clutch housing and operated separately or together.

5. A combination clutch-brake comprising:

a. a clutch unit including a clutch housing having spaced arcuate voids as air passageways formed in the outer portion thereof, b. a first hub having means for connection with a shaft of a prime mover, c. an annular clutch piston slidably mounted on said first hub, d. an annular clutch cylinder formed on said housing and in which said clutch piston axially reciprocates, e. a friction disc having radially extended cooling fins thereon and slidably mounted on and rotatable with said first hub said fins adjacent said arcuate spaced voids, f. a brake unit including a disc journal mounted on, g. a second hub, h. means rotatably mounting said second hub axially on said first hub, i. means normally urging said friction disc out of engagement with said disc journal, j. a brake housing having spaced arcuate voids as air passageways formed in the outer portion thereof and mounted on said second hub, k. means separably connecting said clutch housing with said brake housing, l. said brake housing having an annular brake cylinder formed therein, m. an annular piston base having an annular brake piston thereon and slidable within said annular brake cylinder, n. said annular brake piston base having a friction facing thereon in axial alignment with said disc journal, o. means for normally urging said annular brake piston base with said friction facing thereon out of engagement with said disc journal, p. means for causing fluid pressure to urge said clutch piston against said friction disc to cause said second hub to rotate, q. means for causing fluid pressure to urge said brake piston against said disc journal to brake said second hub, r. said friction disc being formed with air passageways extending axially therethrough and radially spaced from said first hub, s. said disc journal being formed with air passageways extending axially and radially therethrough and communicating with said air passageways of said friction disc, t. said brake piston base being formed with annular air passageways extending axially therethrough and radially spaced from said second hub and communicating with said air passageways of said disc journal, the rotation of said friction disc causing a flow of air into and out of the air passageways of said clutch housing and friction disc which draws a second flow of air inwardly through the air passageways of the disc journal and a third flow of air inwardly through the air passageways of said brake housing and brake body, said second and third air flows joining said first air flow for exodus out of the clutch housing thereby cooling the brake unit when the disc journal is braked and not braked and alternatively when the friction disc is in engagement with the disc journal and rotating the disc journal air is drawn radially inwardly through the air passageways of said brake housing and brake body and is exhausted outwardly through the air passageways of said disc journal thereby cooling the brake unit, u. said means for normally urging said friction disc out of engagement with said disc journal including a coil spring mounted concentrically on said first hub in abutment at one end with said friction disc and in abutment at the other end with v. a shoulder carried by said first hub, w. said means connecting said clutch housing with said brake housing being separable and including a bearing mounted on said shoulder of said first hub, x. said second hub formed with a recess in which said bearing is mounted whereby the brake housing and the components thereof may be separated from the clutch housing and used separately or together.

6. A combination clutch-brake comprising:

a. a clutch unit including a clutch housing having spaced arcuate voids as air passageways formed in the outer portion thereof, b. a first hub having means for connection with a shaft of a prime mover, c. an annular clutch piston slidably mounted on said first hub, d. an annular clutch cylinder formed on said housing and in which said clutch piston axially reciprocates, e. a friction disc having radially extended cooling fins thereon and slidably mounted on and rotatable with said first hub said fins adjacent said arcuate spaced voids, f. a brake unit including a disc journal mounted on, g. a second hub, h. means rotatably mounting said second hub axially on said first hub, i. means normally urging said friction disc out of engagement with said disc journal, j. a brake housing having spaced arcuate voids as air passageways formed in the outer portion thereof and mounted on said second hub, k. means separably connecting said clutch housing with said brake housing, l. said brake housing having an annular brake cylinder formed therein, m. an annular piston base having an annular brake piston thereon and slidable within said annular brake cylinder, n. said annular brake piston base having a friction facing thereon in axial alignment with said disc journal, o. means for normally urging said annular brake piston base with said friction facing thereon out of engagement with said disc journal, p. means for causing fluid pressure to urge said clutch piston against said friction disc to cause said second hub to rotate, q. means for causing fluid pressure to urge said brake piston against said disc journal to brake said second hub, r. said friction disc being formed with air passageways extending axially therethrough and radially spaced from said first hub, s. said disc journal being formed with air passageways extending axially and radially therethrough and communicating with said air passageways of said friction disc, t. said brake piston base being formed with annular air passageways extending axially therethrough and radially spaced from said second hub and communicating with said air passageways of said disc journal, the rotation of said friction disc causing a flow of air into and out of the air passageways of said clutch housing and friction disc which draws a second flow of air inwardly through the air passageways of the disc journal and a third flow of air inwardly through the air passageways of said brake housing and brake body, said second and third air flows joining said first air flow for exodus out of the clutch housing thereby cooling the brake unit when the disc journal is braked and not braked and alternatively when the friction disc is in engagement with the disc journal and rotating the disc journal air is drawn radially inwardly through the air passageways of said brake housing and brake body and is exhausted outwardly through the air passageways of said disc journal thereby cooling the brake unit, u. said means for normally urging said friction disc out of engagement with said disc journal including a coil spring mounted concentrically on said first hub in abutment at one end with said friction disc and in abutment at the other end with v. a shoulder carried by said first hub, w. said means for normally urging said annular brake piston with said friction facing thereon out of engagement with said disc journal including a rim connected by webs to said brake housing, x. a multiplicity of spring guide pins connected to said rim and extending through said air passageways of said brake housing, y. a multiplicity of eye bolts mounted on said annular piston base extending radial therefrom and through which said guide pins extend, z. a coil spring mounted on at least one of said guide pins between said rim and the eye of said eye bolt, aa. said means connecting said clutch housing with said brake housing being separable and including a bearing mounted on said shoulder of said first hub, bb. said second hub formed with a recess in which said bearing is mounted whereby the brake housing and the components thereof may be separated from the clutch housing and used separately or together.

7. A combination clutch-brake for combined use or use of the clutch or brake singly comprising:
a. a clutch housing,
b. a first hub mounted in said clutch housing for connection with a prime mover shaft,
c. a clutch disc body slidably mounted on said hub,
d. a brake housing,
e. a second hub mounted in said brake housing,
f. means removably connecting said second hub axially upon said first hub,
g. a disc journal carried by said second hub,
h. means for slidably moving said clutch disc axially on said first hub into contact with said disc journal to drive said hub,
i. means for braking said disc journal to brake said second hub, and
j. means removably connecting said clutch housing with said brake housing simultaneously with the connection of the second hub on the first hub.

* * * * *